UNITED STATES PATENT OFFICE.

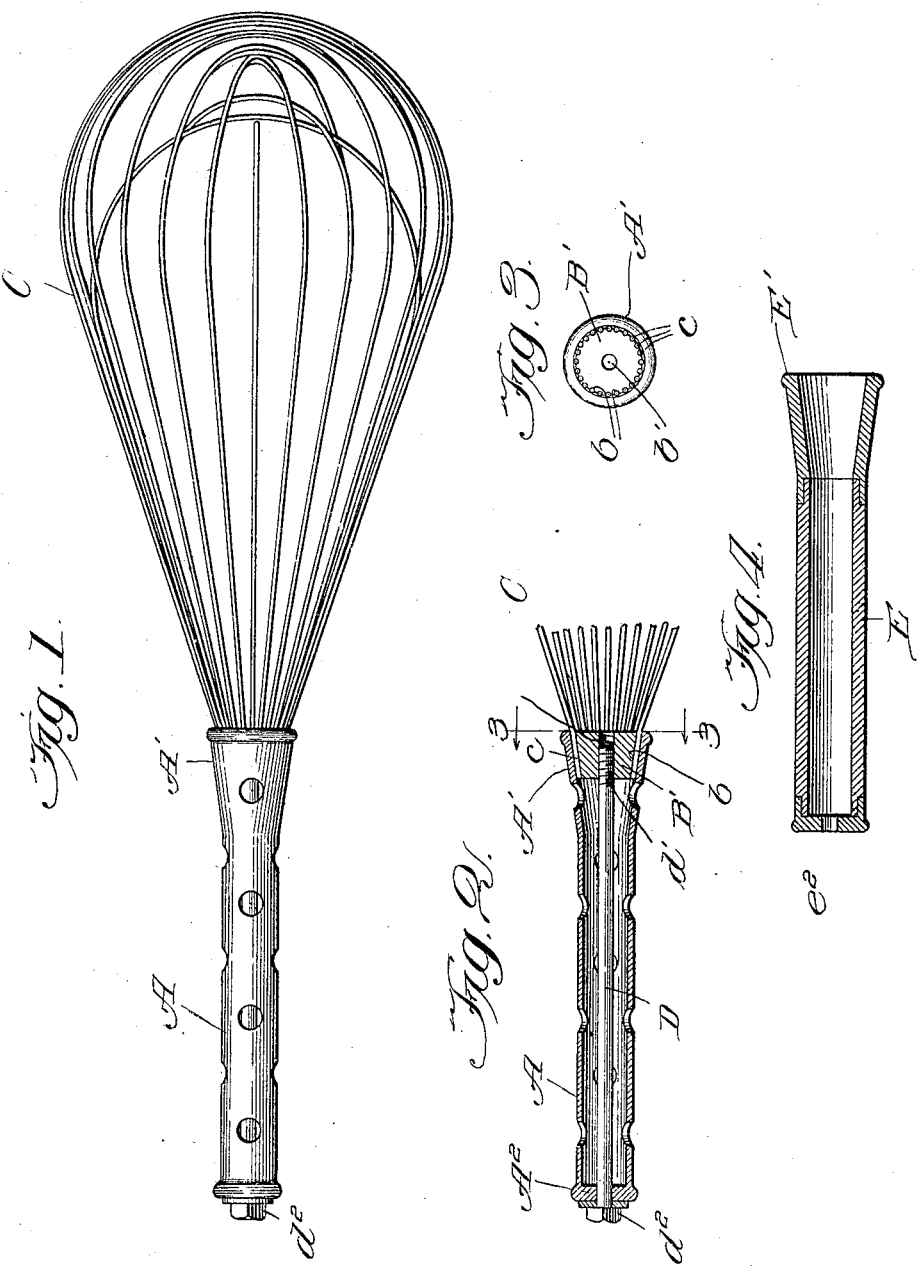

WALTER H. TOMLINSON, OF CHICAGO, ILLINOIS.

EGG-BEATER.

No. 871,247.                     Specification of Letters Patent.            Patented Nov. 19, 1907.

Application filed October 28, 1905. Serial No. 284,818.

*To all whom it may concern:*

Be it known that I, WALTER H. TOMLINSON, a citizen of the United States, residing at Chicago, county of Cook, State of Illinois, have invented a certain new and useful Improvement in Egg-Beaters, and declare the following to be a full, clear, and exact description of the same, such as will enable others skilled in the art to which it pertains to make and use the same, reference being had to the accompanying drawings, which form a part of this specification.

My invention relates in general to culinary utensils, and more particularly to egg beaters.

When large numbers of eggs are simultaneously beaten, as by bakers in making angel food and other cake, a beater of great structural strength is required. It has heretofore been customary to construct egg beaters of loops of wire the ends of which are either soldered to a handle or are secured thereto by wire wrapped around the handle. It frequently happens that the beating wires are either broken or become detached from the handle thereby destroying the usefulness of the beater.

The primary object of my invention is to provide an egg beater which will be of such strength as to withstand the strain incident to beating large numbers of eggs, and in which the beating loops of wire will be so secured to the handle as to prevent their detachment therefrom.

A further object of my invention is to provide an egg beater in which the wire loops, if broken, may be readily replaced by new ones, and in which the wire loops should they become detached from the handle may be easily reattached thereto.

A further object of my invention is to provide an egg beater which will be strong though simple in construction, inexpensive in manufacture, and efficient in use.

My invention generally described comprises a tubular handle having a flaring end, a tapered block fitting within the flaring end of the handle, a plurality of wire loops the ends of which extend within the flaring end of the handle and are clamped therein by the block, and a bolt extending through the handle into engagement with the block thereby causing the latter to tightly grip the ends of the wire loops.

My invention will be more fully described hereinafter with reference to the accompanying drawing in which the same is illustrated as embodied in a convenient and practical form, and in which,—

Figure 1 is a plan view; Fig. 2 a central sectional view through the handle, the wire loops being broken away; Fig. 3 a sectional view on line 3—3 Fig. 2, and Fig. 4 a sectional view of a modified form of handle.

Similar reference characters are used to designate the similar parts in the several figures of the drawing.

Referring more particularly to Figs. 1, 2 and 3 reference letter A indicates a handle of tubular form having an outwardly flaring end A'. The handle may be conveniently made of cast metal having holes therethrough to decrease its weight and to facilitate the handle being tightly held by the hand.

B' indicates a tapered block preferably made of metal adapted to fit within the flaring end A' of the handle. The outer surface of the block B' is provided with longitudinal grooves $b$ while a screw-threaded hole $b'$ extends through the center of the block.

C indicates loops of wire the ends of which are received within the grooves $b$ in the block B' and clamped between such block and the inner surface of the flaring end A' of the handle.

In order to secure the block within the handle a bolt D having a screw-threaded end $d'$ extends through the handle the screw-threaded end of which is received within a screw-threaded hole in the block. The head $d^2$ of the bolt engages the end A² of the handle through which the bolt extends. It is obvious that by rotating the bolt by means of a wrench or other device applied to the head thereof, the block may be drawn inwardly with respect to the handle thereby securely gripping the ends $c$ of the wire loops C between the block and the handle. Should any of the wire loops become detached from the handle or be broken, the bolt D may be rotated in a reverse direction so as to be disengaged from the block thereby permitting the latter to be removed from the handle. The ends of the wire loops may then be reinserted between the block and the handle, or in the event of the wire loops being broken, new loops may be secured in place of the broken ones.

In Fig. 4 I have illustrated a modified form of handle in which the same is formed of a tubular piece of wood E having a metal end cap $e^2$ at one end and a metal flaring portion $E^7$ at the other end. The handle illustrated in Fig. 4 is used in connection with the same coöperating parts as is the handle A above described.

From the foregoing description it will be observed that I have invented an improved egg beater which is strong and durable in construction and in which the wire loops may be replaced when broken or reattached to the handle should they become disconnected therefrom.

Having now fully described my invention what I claim as new and desire to secure by Letters Patent is:

1. In an egg beater, the combination with a handle having a flaring end, a plurality of wire loops the ends of which extend within said flaring end of the handle, a conical block arranged within the flaring end of the handle for clamping the ends of the wire loops against the interior of the handle, a bolt extending throughout the length of the handle and connected at one end to said block so as to cause the block to move positively into or out of its clamping position and the other end of the bolt projecting beyond the end of the handle and having thereon a shoulder for engagement with the exterior of the handle.

2. In an egg beater, the combination with a tubular handle having a flaring end, a plurality of wire loops the ends of which extend within said flaring end of the handle, a conical block arranged within said flaring end and adapted to clamp the ends of the wire loops against the interior of the handle, a bolt having screw-threads at one end which engage with corresponding screw-threads on said block, the other end of said bolt projecting beyond the opposite end of the handle and being provided with a head which engages with the exterior of the handle when the bolt is turned to draw the conical block into its clamping position.

In testimony whereof, I sign this specification in the presence of two witnesses.

W. H. TOMLINSON.

Witnesses:
 GEO. L. WILKINSON,
 C. A. MULLEN.